(12) United States Patent
Ahn et al.

(10) Patent No.: US 6,482,888 B1
(45) Date of Patent: Nov. 19, 2002

(54) SILICONE COMPOSITION AND CURED SILICONE PRODUCT

(75) Inventors: Dongchan Ahn, Midland, MI (US); Michael Andrew Lutz, Hope, MI (US)

(73) Assignee: Dow Corning Corporation, Midland, MI (US)

(*) Notice: Subject to any disclaimer, the term of this patent is extended or adjusted under 35 U.S.C. 154(b) by 0 days.

(21) Appl. No.: 09/874,025

(22) Filed: Jun. 6, 2001

(51) Int. Cl.[7] .................... C08L 83/05; C08L 83/07
(52) U.S. Cl. .................... 524/588; 528/12; 528/29; 528/31; 528/32; 528/33; 528/25; 528/18; 525/478; 525/474; 556/51
(58) Field of Search .................... 528/12, 18, 29, 528/31, 32, 33, 25; 525/478, 474; 556/51

(56) References Cited

U.S. PATENT DOCUMENTS 5,364,921 A   11/1994   Gray et al. .................... 528/15
5,683,527 A   11/1997   Angell et al. .................... 156/78

FOREIGN PATENT DOCUMENTS

EP   0 718 432 A1   6/1996   ........ D06M/15/643

*Primary Examiner*—Robert Dawson
*Assistant Examiner*—Kuo-Liang Peng
(74) *Attorney, Agent, or Firm*—Larry A. Milco

(57) ABSTRACT

A silicone composition prepared by mixing (A) 100 parts by weight of an organopolysiloxane containing an average of at least two silicon-bonded alkenyl groups per molecule, (B) an organohydrogenpolysiloxane containing an average of at least two silicon-bonded hydrogen atoms per molecule in a concentration sufficient to cure the composition, (C) 0.5 to 50 parts by weight of a hydroxy-functional organic compound having a molecular weight up to about 1000 and containing at least one hydroxy group and at least one aliphatic carbon-carbon multiple bond per molecule, (D) 1 to 10 parts by weight of a titanium chelate, and (E) a catalytic amount of a hydrosilylation catalyst; and a cured product formed from the composition.

20 Claims, No Drawings

SILICONE COMPOSITION AND CURED SILICONE PRODUCT

FIELD OF THE INVENTION

The present invention relates to a silicone composition and more particularly to a hydrosilylation addition-curable silicone composition comprising a specific combination of a hydroxy-functional organic compound and a titanium chelate. The present invention further relates to a cured silicone product formed from the composition.

BACKGROUND OF THE INVENTION

Silicones are useful in a variety of applications by virtue of their unique combination of properties, including high thermal stability, good moisture resistance, excellent flexibility, high ionic purity, low alpha particle emissions, and good adhesion to various substrates. For example, silicones are widely used in the automotive, electronic, construction, appliance, and aerospace industries.

Addition-curable silicone compositions comprising an alkenyl-containing organopolysiloxane, an organohydrogensiloxane, a titanium compound, a hydroxy-functional organic compound, and a hydrosilylation catalyst are known in the art. For example, U.S. Pat. No. 5,364,921 to Gray et al. discloses a composition curable to a silicone rubber, which comprises an alkenyl-containing polydiorganosiloxane, an organohydrogensiloxane, a hydrosilylation catalyst containing platinum, an epoxy-functional organotrialkoxysilane, an alkoxysilicon compound, and a titanium compound having Ti—O—CH bonds. The '921 patent also teaches the composition can optionally contain an unsaturated non-silicon-containing ether.

U.S. Pat. No. 5,683,527 to Angell et al. discloses a foamable, curable organosiloxane composition comprising an alkenyl-functional polyorganosiloxane, an organohydrogensiloxane, a blowing agent, a platinum catalyst, and an adhesion promoter comprising an epoxy-functional compound, a hydroxyl-functional compound, a tetralkylorthosilicate, an organotitanate, and an aluminum or zirconium compound.

European Patent Application EP 0 718 432 A1 to Collins discloses a curable coating composition comprising a composition curable by a hydrosilylation reaction and includes a silicone resin, a hydrosilylation reaction inhibitor, and an adhesion promoting additive which comprises an organosilicon compound having epoxy and alkoxy functionalities, an alkenylsilanol, an organotitanium compound, and a metal chelate compound.

However, none of the aforementioned references teach the specific combination of a hydroxy-functional organic compound and titanium chelate of the present invention.

SUMMARY OF THE INVENTION

The present invention is directed a silicone composition prepared by mixing:

(A) 100 parts by weight of an organopolysiloxane containing an average of at least two silicon-bonded alkenyl groups per molecule;

(B) an organohydrogenpolysiloxane containing an average of at least two silicon-bonded hydrogen atoms per molecule in a concentration sufficient to cure the composition;

(C) 0.5 to 50 parts by weight of a hydroxy-functional organic compound having a molecular weight up to about 1000 and containing at least one hydroxy group and at least one aliphatic carbon-carbon multiple bond per molecule;

(D) 1 to 10 parts by weight of a titanium chelate having a formula selected from:

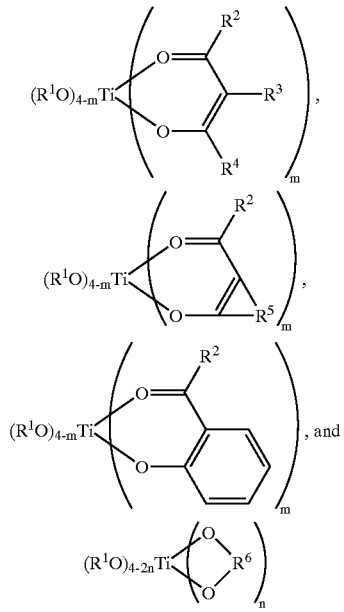

herein each $R^1$ is independently alkyl or —$(R^7O)_qR^8$, wherein $R^7$ is hydrocarbylene, $R^8$ is hydrocarbyl, and q is from 1 to 20; each $R^2$ is independently hydrocarbyl, halohydrocarbyl, cyanoalkyl, alkoxy, cyanoalkoxy, amino, or hydrocarbyl-substituted amino; each $R^3$ is independently hydrogen, hydrocarbyl, halohydrocarbyl, or acyl; each $R^4$ is independently hydrocarbyl, halohydrocarbyl, or cyanoalkyl; $R^5$ is alkanediyl, wherein the free valencies are separated by 3, 4, or 5 carbon atoms; $R^6$ is hydrocarbylene, wherein the free valencies are separated by 2, 3, or 4 carbon atoms; m is an integer from 1 to 3; and n is 1 or 2; wherein $R^1$, $R^2$, $R^3$, $R^4$, $R^5$, and $R^6$ are free of aliphatic carbon-carbon multiple bonds; and (E) a catalytic amount of a hydrosilylation catalyst.

The present invention is further directed to a cured silicone product comprising a reaction product of the above-described composition.

The present invention is still further directed to a multi-part silicone composition comprising components (A) through (E) in two or more parts, provided components (A), (B), and (E) are not present in the same part.

The silicone composition of the present invention has numerous advantages, including low VOC (volatile organic compound) content and adjustable cure. Moreover, the silicone composition cures to form a silicone product having superior adhesion to a wide variety of substrates, particularly plastics.

The silicone composition of the instant invention has numerous uses, particularly in the electronics field. For example, the silicone composition can be used to attach a die to a printed circuit board, encapsulate an electronic device, fill the gap between a heat sink and an electronic device, attach a heat sink to an electronic device, or encapsulate the wire windings in a power transformer or converter. In particular, the silicone composition is useful for bonding electronic components to flexible or rigid substrates.

DETAILED DESCRIPTION OF THE INVENTION

As used herein, the term "aliphatic carbon-carbon multiple bond" refers to an aliphatic carbon-carbon double bond or carbon-carbon triple bond.

The present invention is directed to a silicone composition prepared by mixing:

(A) 100 parts by weight of an organopolysiloxane containing an average of at least two silicon-bonded alkenyl groups per molecule;

(B) an organohydrogenpolysiloxane containing an average of at least two silicon-bonded hydrogen atoms per molecule in a concentration sufficient to cure the composition;

(C) 0.5 to 50 parts by weight of a hydroxy-functional organic compound having a molecular weight up to about 1000 and containing at least one hydroxy group and at least one aliphatic carbon-carbon multiple bond per molecule;

(D) 1 to 10 parts by weight of a titanium chelate having a formula selected from:

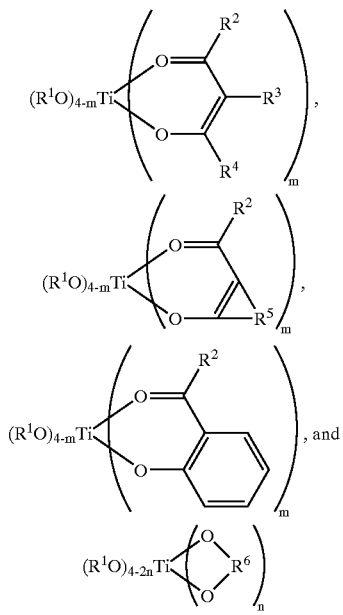

wherein each $R^1$ is independently alkyl or —$(R^7O)_qR^8$, wherein $R^7$ is hydrocarbylene, $R^8$ is hydrocarbyl, and q is from 1 to 20; each $R^2$ is independently hydrocarbyl, halohydrocarbyl, cyanoalkyl, alkoxy, cyanoalkoxy, amino, or hydrocarbyl-substituted amino; each $R^3$ is independently hydrogen, hydrocarbyl, halohydrocarbyl, or acyl; each $R^4$ is independently hydrocarbyl, halohydrocarbyl, or cyanoalkyl; $R^5$ is alkanediyl, wherein the free valencies are separated by 3, 4, or 5 carbon atoms; $R^6$ is hydrocarbylene, wherein the free valencies are separated by 2, 3, or 4 carbon atoms; m is an integer from 1 to 3; and n is 1 or 2; wherein $R^1$, $R^2$, $R^3$, $R^4$, $R^5$, and $R^6$ are free of aliphatic carbon-carbon multiple bonds; and (E) a catalytic amount of a hydrosilylation catalyst.

Component (A) is at least one organopolysiloxane containing an average of at least two silicon-bonded alkenyl groups per molecule. The organopolysiloxane can have a linear, branched, or resinous structure. The organopolysiloxane can be a homopolymer or a copolymer. The alkenyl groups typically have from 2 to about 10 carbon atoms and are exemplified by, but not limited to, vinyl, allyl, butenyl, and hexenyl. The alkenyl groups in the organopolysiloxane may be located at terminal, pendant, or both terminal and pendant positions. The remaining silicon-bonded organic groups in the organopolysiloxane are independently selected from monovalent hydrocarbon and monovalent halogenated hydrocarbon groups free of aliphatic unsaturation. These monovalent groups typically have from 1 to about 20 carbon atoms, preferably have from 1 to 10 carbon atoms, and are exemplified by, but not limited to alkyl such as methyl, ethyl, propyl, pentyl, octyl, undecyl, and octadecyl; cycloalkyl such as cylcohexyl; aryl such as phenyl, tolyl, xylyl, benzyl, and 2-phenylethyl; and halogenated hydrocarbon group such as 3,3,3-trifluoropropyl, 3-chloropropyl, dichlorophenyl, and 6,6,6,5,5,4,4,3,3-nonafluorohexyl. Preferably, at least 50 percent, and more preferably at least 80%, of the organic groups free of aliphatic unsaturation in the organopolysiloxane are methyl.

The viscosity of the organopolysiloxane at 25° C., which varies with molecular weight and structure, is typically from 0.05 to 500 Pa.s, preferably from 0.1 to 200 Pa.s, and more preferably from 0.1 to 100 Pa.s.

Examples of organopolysiloxanes include, but are not limited to, polydiorganosiloxanes having the following formulae: $ViMe_2SiO(Me_2SiO)_cSiMe_2Vi$, $ViMe_2SiO(Me_2SiO)_{0.25c}(MePhSiO)_{0.75c}SiMe_2Vi$, $ViMe_2SiO(Me_2SiO)_{0.95c}(Ph_2SiO)_{0.05c}SiMe_2Vi$, $ViMe_2SiO(Me_2SiO)_{0.98c}(MeViSiO)_{0.02c}SiMe_2Vi$, $Me_3SiO(Me_2SiO)_{0.95c}(MeViSiO)_{0.05c}SiMe_3$, and $PhMeViSiO(Me_2SiO)_cSiPhMeVi$; where Me, Vi, and Ph denote methyl, vinyl, and phenyl respectively and c has a value such that the viscosity of the polydiorganosiloxane is from 0.05 to 500 Pa.s at 25° C.

Methods of preparing polydiorganosiloxanes suitable for use in the silicone composition, such as hydrolysis and condensation of the corresponding organohalosilanes or equilibration of cyclic polydiorganosiloxanes, are well known in the art.

Examples of organopolysiloxane resins include an MQ resin consisting essentially of $R^{10}_3SiO_{1/2}$ units and $SiO_{4/2}$ units, a TD resins consisting essentially of $R^{10}SiO_{3/2}$ units and $R^{10}_2SiO_{2/2}$ units, an MT resin consisting essentially of $R^{10}_3SiO_{3/2}$ units and $R^{10}SiO_{3/2}$ units, and an MTD resin consisting essentially of $R^{10}_3SiO_{1/2}$ units, $R^{10}SiO_{3/2}$ units, and $R^{10}_2SiO_{2/2}$ units, wherein each $R^{10}$ is independently selected from monovalent hydrocarbon and monovalent halogenated hydrocarbon groups.

The monovalent groups represented by $R^{10}$ typically have from 1 to about 20 carbon atoms and preferably have from 1 to about 10 carbon atoms. Examples of monovalent groups include, but are not limited to, alkyl such as methyl, ethyl, propyl, pentyl, octyl, undecyl, and octadecyl; cycloalkyl such as cylcohexyl; alkenyl such as vinyl, allyl, butenyl, and hexenyl; aryl such as phenyl, tolyl, xylyl, benzyl, and 2-phenylethyl; and halogenated hydrocarbon groups such as 3,3,3-trifluoropropyl, 3-chloropropyl, dichlorophenyl, and 6,6,6,5,5,4,4,3,3-nonafluorohexyl. Preferably, at least one-third, and more preferably substantially all $R^{10}$ groups in the organopolysiloxane resin are methyl. A preferred organopolysiloxane resin consists essentially of $(CH_3)_3SiO_{1/2}$ siloxane units and $SiO_{4/2}$ wherein the mole ratio of $(CH_3)_3SiO_{1/2}$ units to $SiO_{4/2}$ units is from 0.6 to 1.9.

Preferably, the organopolysiloxane resin contains an average of from about 3 to 30 mole percent of alkenyl groups. The mole percent of alkenyl groups in the resin is defined here as the ratio of the number of moles of alkenyl-containing siloxane units in the resin to the total number of moles of siloxane units in the resin, multiplied by 100.

Methods of preparing organopolysiloxane resins are well known in the art. For example, a preferred organopolysiloxane resin is prepared by treating a resin copolymer produced by the silica hydrosol capping process of Daudt et al. with at least an alkenyl-containing endblocking reagent. The method of Daudt et al, is disclosed in U.S. Pat. No. 2,676,182, which is hereby incorporated by reference to teach how to make organopolysiloxane resins suitable for use in the present invention.

Briefly stated, the method of Daudt et al. involves reacting a silica hydrosol under acidic conditions with a hydrolyzable triorganosilane such as trimethylchlorosilane, a siloxane such as hexamethyldisiloxane, or mixtures thereof, and recovering a copolymer having M and Q units. The resulting copolymers generally contain from about 2 to about 5 percent by weight of hydroxyl groups.

The organopolysiloxane resin, which typically contains less than 2 percent by weight of silicon-bonded hydroxyl groups, can be prepared by reacting the product of Daudt et al. with an alkenyl-containing endblocking agent or a mixture of an alkenyl-containing endblocking agent and an endblocking agent free of aliphatic unsaturation in an amount sufficient to provide from 3 to 30 mole percent of alkenyl groups in the final product. Examples of endblocking agents include, but are not limited to, silazanes, siloxanes, and silanes. Suitable endblocking agents are known in the art and exemplified in U.S. Pat. No. 4,584,355 to Blizzard et al.; U.S. Pat. No. 4,591,622 to Blizzard et al.; and U.S. Pat. No. 4,585,836 to Homan et al.; which are hereby incorporated by reference. A single endblocking agent or a mixture of such agents can be used to prepare the organopolysiloxane resin.

Component (A) can be a single organopolysiloxane or a mixture comprising two or more organopolysiloxanes that differ in at least one of the following properties: structure, viscosity, average molecular weight, siloxane units, and sequence.

Component (B) is at least one organohydrogenpolysiloxane containing an average of at least two silicon-bonded hydrogen atoms per molecule. It is generally understood that crosslinking occurs when the sum of the average number of alkenyl groups per molecule in component (A) and the average number of silicon-bonded hydrogen atoms per molecule in component (B) is greater than four. The silicon-bonded hydrogen atoms in the organohydrogenpolysiloxane can be located at terminal, pendant, or at both terminal and pendant positions.

The organohydrogenpolysiloxane can be a homopolymer or a copolymer. The structure of the organohydrogenpolysiloxane can be linear, branched, cyclic, or resinous. Examples of siloxane units that may be present in the organohydrogenpolysiloxane include, but are not limited to, $HR^{11}_2SiO_{1/2}$, $R^{11}_3SiO_{1/2}$, $HR^{11}SiO_{2/2}$, $R^{11}_2SiO_{2/2}$, $R^{11}SiO_{3/2}$, and $SiO_{4/2}$ units. In the preceding formulae each $R^{11}$ is independently selected from monovalent hydrocarbon and monovalent halogenated hydrocarbon groups free of aliphatic unsaturation, as defined and exemplified above for component (A). Preferably, at least 50 percent of the organic groups in the organohydrogenpolysiloxane are methyl.

Examples of organohydrogenpolysiloxanes include, but are not limited to, a trimethylsiloxy-terminated poly(methylhydrogensiloxane), a trimethylsiloxy-terminated poly(dimethylsiloxane/methylhydrogensiloxane), a dimethylhydrogensiloxy-terminated poly(methylhydrogensiloxane), a dimethylhydrogensiloxy-terminated polydimethylsiloxane, and a resin consisting essentially of $H(CH_3)_2SiO_{1/2}$ units and $SiO_{4/2}$ units.

Component (B) can be a single organohydrogenpolysiloxane or a mixture comprising two or more organohydrogenpolysiloxanes that differ in at least one of the following properties: structure, average molecular weight, viscosity, siloxane units, and sequence.

The concentration of component (B) in the silicone composition is sufficient to cure (crosslink) the composition. The exact amount of component (B) depends on the desired extent of cure, which generally increases as the ratio of the number of moles of silicon-bonded hydrogen atoms in component (B) to the number of moles of alkenyl groups in component (A) increases. Typically, the concentration of component (B) is sufficient to provide from 0.5 to 5 silicon-bonded hydrogen atoms per alkenyl group in components (A) and (C) combined. Preferably, the concentration of component (B) is sufficient to provide from 0.8 to 2 silicon-bonded hydrogen atoms per alkenyl group in components (A) and (C) combined.

Methods of preparing linear, branched, and cyclic organohydrogenpolysiloxanes, such as hydrolysis and condensation of organohalosilanes, are well known in the art. Methods of preparing organohydrogenpolysiloxane resins are also well known as exemplified in U.S. Pat. Nos. 5,310,843; 4,370,358; and 4,707,531.

To ensure compatibility of components (A) and (B), the predominant organic group in each component is preferably the same. Preferably, this group is methyl.

Component (C) is at least one hydroxy-functional organic compound having a molecular weight up to about 1000 and containing at least one hydroxy group and at least one aliphatic carbon-carbon multiple bond per molecule. When component (C) is a polydisperse hydroxy-functional organic compound, such as poly(ethylene glycol)monoallyl ether, the term "molecular weight" refers specifically to the number-average molecular weight ($M_n$) of the compound. The $M_n$ of a polydisperse hydroxy-functional organic compound can be determined using methods well known for the particular type of compound. Examples of such methods include gel permeation chromatography (GPC) using appropriate molecular weight standards, proton nuclear magnetic resonance spectrometry ($^1$HNMR), and carbon-13 nuclear magnetic resonance spectrometry ($^{13}$CNMR). When the molecular weight of the hydroxy-functional organic compound is greater than about 1000, the silicone product formed by curing the composition does not exhibit substantially improved adhesion relative to the silicone product formed by curing a similar silicone composition lacking only the hydroxy-functional organic compound.

The structure of the hydroxy-functional organic compound can be linear, branched, or cyclic. The hydroxy group(s) in the hydroxy-functional organic compound may be attached to a primary, secondary or tertiary aliphatic carbon atom; an aromatic carbon atom; or a doubly bonded carbon atom in the molecule. The carbon-carbon multiple bond can be located at an internal or a terminal position in the hydroxy-functional organic compound. Preferably, the carbon-carbon multiple bond is located at a terminal position, and more preferably it is part of a terminal group having the formula —CH=CH$_2$. Furthermore, there are no restrictions on the stereochemistry of the hydroxy-bearing carbon atom(s) or carbon-carbon multiple bond(s).

The hydroxy-functional organic compound can contain additional functional groups, provided the compound does not substantially inhibit cure of the composition. Examples of suitable functional groups include, but are not limited to, —OR$^{12}$, epoxy, >C=O, —CHO, —CO$_2$R$^{12}$, —C≡N, —NO$_2$, >C=C<, —F, —Cl, —Br, and —I, wherein R$^{12}$ is a monovalent hydrocarbon or halogenated hydrocarbon group. However, hydroxy-functional organic compounds containing functional groups that strongly complex the hydrosilylation catalyst, such as —SH, —NH$_2$, —S—, —SO—, —SO$_2$—, ≡P, ≡P(≡O), and =P(=O)OH, may substantially inhibit cure of the composition. The degree of inhibition depends on the mole ratio of the particular functional group to platinum group metal in the hydrosilylation catalyst. The suitability of a particular hydroxy-functional organic compound for use in the silicone composition of the present invention can be readily determined by routine experimentation using the methods in the Examples below.

The hydroxy-functional organic compound can be a naturally occurring or synthetic compound having a liquid or solid state at room temperature. Also, the hydroxy-functional organic compound can be soluble, partially soluble, or insoluble in the silicone composition. The normal boiling point of the hydroxy-functional organic compound, which depends on the molecular weight, structure, and number and nature of functional groups in the compound, can vary over a wide range. Preferably, the hydroxy-functional organic compound has a normal boiling point greater than the cure temperature of the composition. Otherwise, appreciable amounts of the hydroxy-functional organic compound may be removed by volatilization during cure, resulting in little or no improvement in the adhesion of the cured silicone product. Also, excessive volatilization of the hydroxy-functional organic compound during curing may cause formation of voids in the cured silicone product.

Examples of hydroxy-functional organic compounds include, but are not limited to, 5-hexen-1-ol and undecylenyl alcohol, a poly(ethylene glycol)monoallyl ether, a poly(propylene glycol)monoallyl ether, a poly(ethylene glycol)-co-(propylene glycol)monoallyl ether, trimethylolpropane diallyl ether, CH$_2$=CHCO$_2$(CH$_2$)$_6$OH, CH$_2$=C(CH$_3$)CO$_2$(CH$_2$)$_6$OH, CH$_2$=CHCONH(CH$_2$)$_6$OH, and CH$_2$=C(CH$_3$)CONH(CH$_2$)$_6$OH. The hydroxy-functional organic compound can be a single compound or a mixture of two or more different compounds.

The concentration of component (C) is typically from 0.5 to 50 parts by weight, preferably from 0.5 to 10 parts by weight, and more preferably from 0.5 to 5 parts by weight, per 100 parts by weight of component (A). When the concentration of component (C) is less than about 0.5 parts by weight, the cured silicone product typically does not exhibit a substantial improvement in adhesion. When the concentration of component (C) is greater than about 50 parts by weight, excessive evolution of hydrogen gas typically occurs during curing due to reaction of the silicon-bonded hydrogen atoms in the organohydrogenpolysiloxane and hydroxy groups in the hydroxy-functional organic compound in the presence of the hydrosilylation catalyst. The evolution of hydrogen can cause the formation of voids in the cured silicone product.

Methods of preparing hydroxy-functional organic compounds suitable for use in the silicone composition of the present invention are well known in the art; many of these compounds are commercially available.

Component (D) is at least one titanium chelate having a formula selected from:

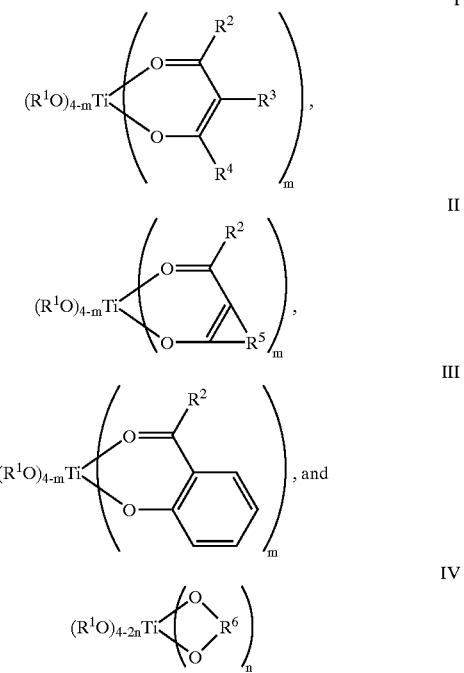

wherein each R$^1$ is independently alkyl or —(R$^7$O)$_q$R$^8$, wherein R$^7$ is hydrocarbylene, R$^8$ is hydrocarbyl, and q is from 1 to 20; each R$^2$ is independently hydrocarbyl, halohydrocarbyl, cyanoalkyl, alkoxy, cyanoalkoxy, amino, or hydrocarbyl-substituted amino; each R$^3$ is independently hydrogen, hydrocarbyl, halohydrocarbyl, or acyl; each R$^4$ is independently hydrocarbyl, halohydrocarbyl, or cyanoalkyl; R$^5$ is alkanediyl, wherein the free valencies are separated by 3, 4, or 5 carbon atoms; R$^6$ is hydrocarbylene, wherein the free valencies are separated by 2, 3, or 4 carbon atoms; m is an integer from 1 to 3; and n is 1 or 2; wherein R$^1$, R$^2$, R$^3$, R$^4$, R$^5$, and R$^6$ are free of aliphatic carbon-carbon multiple bonds.

The alkyl, hydrocarbyl, halohydrocarbyl, cyanoalkyl, alkoxy, cyanoalkoxy, and acyl groups in the formulae of the titanium chelate, which are free of aliphatic carbon-carbon multiple bonds, typically have from 1 to 18 carbon atoms and, preferably, have from 1 to 12 carbon atoms.

Examples of alkyl groups represented by R$^1$ include, but are not limited to, unbranched and branched alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, decyl, undecyl, dodecyl, tridecyl, tetradecyl, pentadecyl; and cycloalkyl, such as cyclopentyl, cyclohexyl, and methylcyclohexyl.

Examples of groups represented by R$^1$ having the formula —(R$^7$O)$_q$R$^8$, where R$^7$ and R$^8$, and q are as defined above, include, but are not limited to, —CH$_2$OCH$_3$, —CH$_2$CH$_2$OCH$_3$, and —OCH$_2$CH$_2$OCH$_2$CH$_3$.

Examples of hydrocarbyl groups represented by R$^2$, R$^3$, R$^4$, and R$^8$ include, but are not limited to, unbranched and branched alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, decyl, undecyl, dodecyl, tridecyl, tetradecyl, pentadecyl; cycloalkyl, such as cyclopentyl, cyclohexyl, and methylcyclohexyl; aryl, such as phenyl and naphthyl; alkaryl, such as tolyl and xylyl; and aralkyl, such as benzyl and phenethyl.

Examples of halohydrocarbyl groups represented by $R^2$, $R^3$, and $R^4$ include, but are not limited to, trifluormethyl, pentafluoroethyl, heptafluoropropyl, and 6,6,6,5,5,4,4,3,3-nonafluorohexyl.

Examples of cyanoalkyl groups represented by $R^2$ and $R^4$ include, but are not limited to, cyanomethyl, cyanoethyl, cyanopropyl, cyanobutyl, and cyanooctyl.

Examples of alkoxy groups represented by $R^2$ include, but are not limited to, methoxy, ethoxy, propoxy, isopropoxy, butoxy, isobutoxy, and pentyloxy.

Examples of cyanoalkoxy groups represented by $R^2$ include, but are not limited to, cyanoethoxy, cyanopropoxy, and cyanobutoxy.

Examples of hydrocarbyl-substituted amino groups represented by $R^2$ include, but are not limited to, methylamino, dimethylamino, and diethylamino.

Examples of acyl groups represented by $R^3$ include, but are not limited to, acetyl, propionyl, butyryl, and stearoyl.

The alkanediyl groups represented by $R^5$ typically have from 3 to 18 carbon atoms and, preferably, have from 3 to 12 carbon atoms. Furthermore, the free valences of the alkanediyl group are typically separated by 3, 4, or 5 carbon atoms and, preferably, they are separated by 3 or 4 carbon atoms. Examples of alkanediyl groups represented by $R^5$ include, but are not limited to, —$CH_2CH_2$—, —$CH_2CH_2CH_2$—, —$CH_2CH_2CH_2CH_2$—, and —$CH_2(CH_2)_3CH_2$—.

The hydrocarbylene groups represented by $R^6$ typically have from 2 to 18 carbon atoms and, preferably, have from 2 to 12 carbon atoms. Furthermore, the free valences of the hydrocarbylene group are typically separated by 2, 3, or 4 carbon atoms and, preferably, they are separated by 2 or 3 carbon atoms. Examples of hydrocarbylene groups represented by $R^6$ include, but are not limited to, —$CH_2CH_2$—, —$CH_2CH_2CH_2$—, —$CH_2CH(CH_3)$—, —$CH_2(CH_3)_2CH_2$—, o-phenylene,

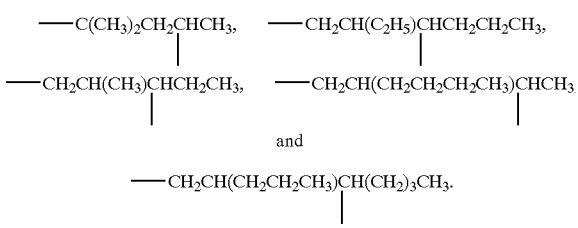

The hydrocarbylene groups represented by $R^7$ typically have from 1 to 18 carbon atoms and, preferably, have from 1 to 12 carbon atoms. Examples of hydrocarbylene groups represented by $R^7$ include, but are not limited to, —$CH_2$—, —$CH_2CH_2$—, —$CH_2CH_2CH_2$—, —$CH_2CH(CH_3)$—, —$CH_2C(CH_3)_2CH_2$—, —$CH_2CH_2CH_2CH_2$—, —$CH_2(CH_2)_3CH_2$—, —$C(CH_3)_2CH_2CH_2CH_2$—, and p-phenylene.

Examples of titanium chelates of the present invention include, but are not limited to, titanium di-n-butoxide bis(2,4-pentanedionate), titanium diisopropoxide bis(ethylacetoacetate), titanium diisopropoxide bis(2,4-pentanedionate), titanium diisopropoxide bis(tetramethylheptanedionate), titanium ethoxide isopropoxide bis(2,4pentanedionate), titanium di-n-butoxide bis(ethylacetoacetate), and titanium di-isobutoxide bis(ethylacetoacetate).

The titanium chelates of the present invention can be prepared using well-known methods of preparing titanium alkoxides, β-dicarbonyl chelates, β-hydroxy carbonyl chelates, and glycol chelates. For example, representative methods are taught by C. S. Rondestvedt in *The Encyclopedia of Chemical Technology*, 3$^{rd}$ ed., John Wiley & Sons: New York, 1983, Vol. 23, pp 177, 179, 187, 189, and 190; R. Feld and P. L. Cowe in *The Organic Chemistry of Titanates*, Butterworth: Washington, 1965, pp 58–80; and Beers et al. in U.S. Pat. No. 4,438,039.

The titanium chelates having formula I wherein m is 1, 2, or 3 and $R^1$ is alkyl can be prepared by treatment of a titanium alkoxide having the formula $Ti(OR)_4$ with m moles, per mole of titanium alkoxide, of a β-dicarbonyl compound having the formula $R^2$—C(=O)—CH($R^3$)—C(=O)—$R^4$, wherein R is C1–C8 alkyl, and $R^2$, $R^3$, $R^4$, and m are as defined above. Homologues wherein $R^1$ is a higher (>C8) alkyl group can be prepared by treatment of the resulting titanium chelate with an appropriate alcohol.

The titanium chelates having formula I where m is 1, 2, or 3 and $R^1$ is —$(R^7O)_qR^8$ can be prepared by treatment of a titanium alkoxide having the formula $Ti(OR)_4$ with m moles, per mole of titanium alkoxide, of a β-dicarbonyl compound having the formula $R^2$—C(=O)—CH($R^3$)—C(=O)—$R^4$ followed by 4-m moles of a hydroxy ether having the formula HO($R^7O)_qR^8$, wherein R, $R^2$, $R^3$, $R^4$, $R^7$, $R^8$, m, and q are as defined above.

The titanium chelates having formula II can be prepared using the methods described above for the preparation of the titanium chelates having formula I by replacing the β-dicarbonyl compound having the formula $R^2$—C(=O)—CH($R^3$)—C(=O)—$R^4$ with a β-dicarbonyl compound having the formula:

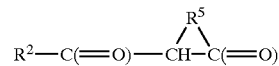

wherein $R^2$ and $R^5$ are as defined above.

The titanium chelates having formula III can be prepared using the methods described above for the preparation of the titanium chelates having formula I by replacing the β-dicarbonyl compound having the formula $R^2$—C(=O)—CH($R^3$)—C(=O)—$R^4$ with a hydroxy carbonyl compound having the formula:

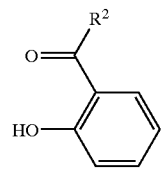

wherein $R^2$ is as defined above.

The titanium chelates having formula IV wherein n is 1 and $R^1$ is alkyl can be prepared by treatment of a titanium alkoxide having the formula $Ti(OR)_4$ with 1 mole, per mole of titanium alkoxide, of a glycol having the formula HO—$R^6$—OH, wherein R and $R^6$ are as defined above. Homologues wherein $R^1$ is a higher (>C8) alkyl group can be prepared by treatment of the resulting titanium chelate with an appropriate alcohol.

The titanium chelates having formula IV wherein p is 1 and $R^1$ is —$(R^7O)_qR^8$ can be prepared by treatment of a titanium alkoxide having the formula $Ti(OR)_4$ with 1 mole, per mole of titanium alkoxide, of a glycol having the formula HO—$R^6$—OH followed by 2 moles, per mole of titanium alkoxide, of a hydroxy ether having the formula HO($R^7O)_qR^8$, wherein R, $R^6$, $R^7$, $R^8$, and q are as defined above.

The titanium chelates having formula IV wherein n is 2 can be prepared by treatment of a titanium alkoxide having the formula Ti(OR)$_4$ with 2 moles, per mole of titanium alkoxide, of a glycol having the formula HO—R$^6$—OH wherein R and R$^6$ are as defined above.

Examples of titanium alkoxides include, but are not limited to, titanium methoxide, titanium n-butoxide, titanium n-propoxide, titanium isopropoxide (also referred to herein as tetra-iso-propyl titanate), titanium t-butoxide, titanium isobutoxide, and titanium 2-ethylhexoxide. Methods of preparing titanium alkoxides are well known in the art; many of these compounds are commercially available. Preferably, the titanium alkoxide, Ti(OR)$_4$, reacts with the β-dicarbonyl compound, hydroxy ether, β-hydroxy carbonyl compound, or glycol to produce an alcohol, ROH, having a lower boiling point than any of the reactants.

Examples of β-dicarbonyl compounds include, but are not limited to, methyl acetoacetate, ethyl acetoacetate, ethyl trifluoroacetoacetate, 2,4-pentanedione, 1,1,1-trifluoropentanedione, 2,6-dimethyl-3,5-heptanedione, methyl 2-oxocyclopentanecarboxylate, methyl 2-oxocyloheptanecarboxylate, and 1-benzoylacetone. The β-dicarbonyl compound can be a single compound or a mixture of two or more different compounds. Methods of preparing β-dicarbonyl compounds, such as the Claisen condensation, are well known in the art.

Examples of hydroxy ethers having the formula HO(R$^7$O)$_q$R$^8$, wherein R$^7$, R$^8$, and q are as defined above, include, but are not limited to, poly(propylene glycol)propyl ether and poly(ethylene glycol)ethyl ether. The hydroxy ether can be a single compound or a mixture of two or more different compounds. Methods of preparing hydroxy ethers represented by the formula HO(R$^7$O)$_q$R$^8$ are well known in the art; many of these compounds are commercially available.

Examples of β-hydroxy carbonyl compounds include, but are not limited to, methyl salicylate, ethyl salicylate, and salicylamide. The β-hydroxy carbonyl compound can be a single compound or a mixture of two or more different compounds. Methods of preparing β-hydroxy carbonyl compounds are well known in the art; many of these compounds are commercially available.

Examples of glycols include, but are not limited to, ethylene glycol, propylene glycol, 1,4-butanediol, 2-methylpentane-2,4-diol, 2,2-dimethyl-1,3-propanediol, 2-ethyl-1,3-hexanediol, 2-methyl-1,3-pentanediol, 2-propyl-1,3-heptanediol, 2-butyl-1,3-butanediol, and catechol. The glycol can be a single compound or a mixture of two or more different compounds. Methods of preparing glycols are well known in the art; many of these compounds are commercially available.

The reaction of the titanium alkoxide with the β-dicarbonyl compound, hydroxy ether, β-hydroxy carbonyl compound, or glycol, is preferably carried out in the absence of atmospheric moisture. This can be accomplished by purging the reactor with a dry inert gas, such as nitrogen, before introducing the reactants and thereafter maintaining an atmosphere of inert gas in the reactor.

The titanium alkoxide is typically treated with the β-dicarbonyl compound, hydroxy ether, β-hydroxy carbonyl compound, or glycol, at room temperature. When the alcohol produced by displacement of alkoxide from the titanium alkoxide has a lower boiling point than any of the reactants, the equilibrium can be shifted toward the product by continuously removing the lower boiling alcohol. For example, the lower boiling alcohol can be removed by distillation under reduced pressure at a moderate temperature.

Preferably, the titanium alkoxide is treated with the β-dicarbonyl compound, hydroxy ether, β-hydroxy carbonyl compound, or glycol, by slowly adding the compound(s) to the alkoxide. Preferably, the β-dicarbonyl compound, β-hydroxy carbonyl compound, or glycol is added first, followed by the hydroxy ether. Also, preferably, the reaction mixture is agitated, for example, by stirring, during each addition step.

Although the above reactions are typically carried out in the absence of a diluent, one or more of the reactants can be dissolved in a hydrocarbon solvent prior to admixture. Examples of hydrocarbon solvents include pentane, hexane, cyclohexane, toluene, and xylene.

The concentration of component (D) is typically from 1 to 10 parts by weight and, preferably, is from 1 to 5 parts by weight, per 100 parts by weight of component (A). When the concentration of component (D) is less than 1 part by weight, the cured silicone product typically does not exhibit a substantial improvement in adhesion. When the concentration of component (D) is greater than 10 parts by weight, the cured silicone product typically does not exhibit further substantial improvement in adhesion.

Component (E) is a hydrosilylation catalyst that promotes the addition reaction of components (A) and (C) with component (B). The hydrosilylation catalyst can be any of the well-known hydrosilylation catalysts comprising a platinum group metal, a compound containing a platinum group metal, or a microencapsulated platinum group metal-containing catalyst. Platinum group metals include platinum, rhodium, ruthenium, palladium, osmium and iridium. Preferably, the platinum group metal is platinum, based on its high activity in hydrosilylation reactions.

Preferred hydrosilylation catalysts include the complexes of chloroplatinic acid and certain vinyl-containing organosiloxanes disclosed by Willing in U.S. Pat. No. 3,419,593, which is hereby incorporated by reference. A preferred catalyst of this type is the reaction product of chloroplatinic acid and 1,3-diethenyl-1,1,3,3-tetramethyldisiloxane.

The hydrosilylation catalyst can also be a microencapsulated platinum group metal-containing catalyst comprising a platinum group metal encapsulated in a thermoplastic resin. Compositions containing microencapsulated hydrosilylation catalysts are stable for extended periods of time, typically several months or longer, under ambient conditions, yet cure relatively rapidly at temperatures above the melting or softening point of the thermoplastic resin(s).

Microencapsulated hydrosilylation catalysts and methods of preparing them are well known in the art, as exemplified in U.S. Pat. No. 4,766,176 and the references cited therein; and U.S. Pat. No. 5,017,654.

The concentration of component (E) is sufficient to catalyze the addition reaction of components (A) and (C) with component (B). Typically, the concentration of component (E) is sufficient to provide from 0.1 to 1000 ppm of a platinum group metal, preferably from 1 to 500 ppm of a platinum group metal, and more preferably from 5 to 150 ppm of a platinum group metal, based on the combined weight of components (A), (B), (C) and (D). The rate of cure is very slow below 0.1 ppm of platinum group metal. The use of more than 1000 ppm of platinum group metal results in no appreciable increase in cure rate, and is therefore uneconomical.

The silicone composition can comprise additional ingredients, provided the ingredient does not prevent the composition from curing to form a silicone product having improved adhesion, as described above. Examples of additional ingredients include, but are not limited to, hydrosilylation catalyst inhibitors, such as 3-methyl-3-penten-1-yne, 3,5-dimethyl-3-hexen-1-yne, 3,5-dimethyl-1-hexyn-3-ol, 1-ethynyl-1-cyclohexanol, 2-phenyl-3-butyn-2-ol, dialkyl fumarates, dialkenyl fumarates, dialkoxyalkyl fumarates, maleates, cyclovinylsiloxanes, and amines; adhesion promoters, such as the adhesion promoters taught in U.S. Pat. Nos. 4,087,585 and 5,194,649; dyes; pigments; anti-oxidants; heat stabilizers; UV stabilizers; flame retardants; flow control additives; reactive diluents; anti-settling agents; fillers, such as fumed silica, calcined silica, wet-method silica, quartz powder, titanium oxide, fumed titanium oxide, calcium carbonate, diatomaceous earth, clay, talc, iron oxide, zinc oxide, aluminum oxide, silicon nitride, boron nitride, diamond powder, copper powder, gold powder, silver powder, silver-coated copper, nickel powder, gold-coated copper powder, and carbon black; silylating agents, such as 4-trimethylsilyloxy)-3-penten-2-one and N-(t-butyl dimethylsilyl)-N-methyltrifluoroacetamide; dessicants, such as zeolites, anhydrous aluminum sulfate, molecular sieves (preferably with a pore diameter of 10 Å or less), kieselguhr, silica gel, and activated carbon; hydrogen-absorbing substances, such as finely divided palladium, platinum or their alloys; and blowing agents, such as water, methanol, ethanol, iso-propyl alcohol, benzyl alcohol,1,4 butanediol, 1,5 pentanediol, 1,7 heptanediol, and silanols.

The silicone composition can be a one-part composition comprising components (A) through (E) in a single part or, alternatively, a multi-part composition comprising components (A) through (E) in two or more parts, provided components (A), (B), and (E) are not present in the same part. Also, to prevent reaction of the organohydrogenpolysiloxane and hydroxy-functional organic compound in the presence of the hydrosilylation catalyst and the consequent generation of hydrogen gas, preferably components (B), (C), and (E) are not present in the same part. For example, a multi-part silicone composition can comprise a first part containing a portion of component (A) and all of components (C), (D), and (E), and a second part containing the remaining portion of component (A) and all of component (B).

The one-part silicone composition is typically prepared by combining components (A) through (E) and any optional ingredients in the stated proportions at ambient temperature with or without the aid of an organic solvent. Although the order of addition of the various components is not critical if the silicone composition is to be used immediately, the hydrosilylation catalyst is preferably added last at a temperature below about 30° C. to prevent premature curing of the composition. Also, the multi-part silicone composition can be prepared by combining the particular components designated for each part.

Mixing can be accomplished by any of the techniques known in the art such as milling, blending, and stirring, either in a batch or continuous process. The particular device is determined by the viscosity of the components and the viscosity of the final silicone composition.

The silicone composition can be applied to a wide variety of solid substrates including, but not limited to, metals such as aluminum, gold, silver, tin-lead, nickel, copper, and iron, and their alloys; silicon; fluorocarbon polymers such as polytetrafluoroethylene and polyvinylfluoride; polyamides such as Nylon; polyimides; epoxies; polyesters; polycarbonates; polyphenylene oxides; ceramics; and glass.

A cured silicone product according to the present invention comprises a reaction product of the silicone composition containing components (A) through (E), described above. The silicone composition can be cured at a temperature from about room temperature to about 250° C., preferably from about room temperature to about 200° C., and more preferably from about room temperature to about 150° C., for a suitable length of time. For example, the silicone composition typically cures in less than about one hour at 150° C.

The silicone composition of the present invention has numerous advantages, including low VOC (volatile organic compound) content and adjustable cure. Moreover, the silicone composition cures to form a silicone product having superior adhesion to a wide variety of substrates, particularly plastics.

The silicone composition of the present invention, which does not require an organic solvent for many applications, has a very low VOC content. Consequently, the present silicone composition avoids the health, safety, and environmental hazards associated with solvent-borne silicone compositions. In addition, the solventless composition of the present invention typically undergoes less shrinkage during curing than solvent-borne silicone compositions.

Additionally, the silicone composition of the present invention cures rapidly at temperatures from room temperature to moderately elevated temperatures without the formation of detectable byproducts. In fact, the cure rate of the silicone composition can be conveniently adjusted by regulating the concentration of catalyst and/or optional inhibitor.

Importantly, the silicone composition of the present invention cures to form a silicone product having unexpectedly improved adhesion to plastic substrates compared with a similar composition either lacking the hydroxy-functional organic compound or the titanium chelate. Improved adhesion is evidenced by an increase in adhesive bond strength or a change in failure mode from adhesive to cohesive.

The silicone composition of the instant invention has numerous uses, particularly in the electronics field. For example, the silicone composition can be used to attach a die to a printed circuit board, encapsulate an electronic device, fill the gap between a heat sink and an electronic device, attach a heat sink to an electronic device, or encapsulate the wire windings in a power transformer or converter. In particular, the silicone composition is useful for bonding electronic components to flexible or rigid substrates.

EXAMPLES

The following examples are presented to further illustrate the silicone composition of this invention, but are not to be considered as limiting the invention, which is delineated in the appended claims. Unless otherwise noted, all parts and percentages reported in the examples are by weight.

Reagents

The following chemical substances were used in the examples:

Silicone Base is a silicone/ground silica blend prepared by heating a mixture consisting of 35% of Polymer A and 65% of Silica in a Neulinger RDH mixer at a temperature of 80° C. under a pressure of 6754 Pa for 40 minutes.

Polymer A is a dimethylvinylsiloxy-terminated polydimethylsiloxane having a viscosity of about 0.45 Pa.s at 25° C.

Silica is a ground silica sold under the name MIN-U-SIL 5 by U.S. Silica (Berkeley Springs, W. Va.). The silica has a topsize of 5 μm (98%<5 μm), a median particle size of 1.6 μm, a tapped density of 41, an untapped density of 31, and a specific gravity of 2.65.

Catalyst A is a mixture consisting of 1% of a platinum(IV) complex of 1,1-diethenyl-1,1,3,3-tetramethyldisiloxane, 92% of Polymer A, and 7% of tetramethyldivinyldisiloxane.

Crosslinking Agent is a trimethylsiloxy-terminated poly (dimethylsiloxane/methylhydrogensiloxane) having an average of 3 dimethylsiloxane units and 5 methylhydrogensiloxane units per molecule and containing about 0.8% of silicon-bonded hydrogen atoms.

ω-Undecylenyl alcohol (10-undecen-1-ol, 98%) is available from Aldrich (Milwaukee, Wis.).

Titanium di-n-butoxide bis(2,4-pentanedionate) is a solution consisting of 73% of titanium di-n-butoxide bis(2,4-pentandionate) in n-butanol, which is available from Gelest, Inc. (Tullytown, Pa.).

Allyl alcohol propoxylate has the formula $H_2C=CHCH_2(OC_3H_6)_nOH$ where n has an average value of 1.6, and the compound has a viscosity (Brookfield, 25° C.) of 5 mPa.s and an average $M_n$ (number-average molecular weight) of about 140–160. The compound is available from Aldrich (Milwaukee, Wis.).

Titanium diisopropoxide bis(ethylacetoacetate), which has the formula

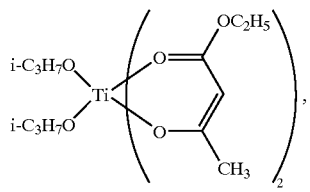

is sold under the name TYZOR DC by DuPont (Wilmington, Del.).

Poly(ethylene glycol)monoallyl ether is a compound having the formula $H_2C=CH_2CH_2(OCH_2CH_2)_nOH$, where n has an average value of 4.

Trimethylolpropane diallyl ether (90%) is available from Aldrich (Milwaukee, Wis.).

Tetra-iso-propyl titanate, which has the formula $(i-C_3H_7O)_4Ti$, is sold under the name TYZOR TPT by DuPont (Wilmington, Del.).

2,4-Pentanedione (99+%) is available from Aldrich (Milwuakee, Wis.).

Ethyl acetoacetate (98%) is available from Aldrich (Milwuakee, Wis.).

1-Undecanol (99%) is available from Aldrich (Milwaukee, Wis.).

Resin/Polymer Blend is a mixture consisting of (i) 27% of an organopolysiloxane resin consisting essentially of $CH_2=CH(CH_3)_2SiO_{1/2}$ units, $(CH_3)_3SiO_{1/2}$ units, and $SiO_{4/2}$ units, wherein the mole ratio of $CH_2=CH(CH_3)_2SiO_{1/2}$ units and $(CH_3)_3SiO_{1/2}$ units combined to $SiO_{4/2}$ units is about 0.7, and the resin has weight-average molecular weight of about 22,000, a polydispersity of about 5, and contains about 1.8% by weight (about 5.5 mole %) of vinyl groups, and (ii) 71% of Polymer B, a dimethylvinylsiloxy-terminated polydimethylsiloxane having a viscosity of about 55 Pas at 25° C.

Catalyst B is a mixture consisting of 1.5% of a platinum (IV) complex of 1,1-diethenyl-1,1,3,3-tetramethyldisiloxane, 93% of Polymer A, 5% of tetramethyldivinyldisiloxane, and 0.5% of dimethyl cyclosiloxanes.

Pigment is a chromium green oxide pigment available from Elementis Pigments (Fairview Heights, Ill.).

Inhibitor is tetramethylvinylcyclotetrasiloxane.

Substrates

The following substrates were cut into flat panels measuring 3 in.×1 in. (7.62 cm×2.54 cm):

FR-4 is the epoxy side of a copper-clad FR-4 (glass-reinforced epoxy) laminate having a thickness of about 0.06 in. (0.152 cm), which is available from Laird Plastics (West Palm Beach, Fla.).

PC is a bisphenol A polycarbonate sheet having a thickness of about 0.25 in. (0.635 cm), which is sold under the name HYZOD M by Exotic Automation & Supply (Farmington Hills, Mich.).

PBT is a poly(butylene terephthalate) resin sheet having a thickness of about 0.25 in. (0.635 cm), which is sold under the name HYDEX 4101 (white) by Boedeker Plastics, Inc. (Shiner, Tex.).

N66 is an extruded nylon 101 type 6/6 polyamide resin sheet having a thickness of about 0.25 in. (0.635 cm), which is available from Boedeker Plastics, Inc. (Shiner, Tex.).

ABS is an acrylonitrile-butadiene-styrene sheet having a thickness of about 0.25 in. (0.635 cm), which is available from Boedeker Plastics, Inc. (Shiner, Tex.).

PPO is a styrene-modified poly(phenylene oxide) sheet having a thickness of about 0.25 in. (0.635 cm), which is sold under the name NORYL EN-265 (black) by Boedeker Plastics, Inc. (Shiner, Tex.).

PPS is a poly(phenylene sulfide) sheet havinga thickness of about 0.125 in. (0.318 cm), which is sold under the trademark TECHTRON PPS (natural) by Boedeker Plastics, Inc. (Shiner, Tex.).

Al is a die-cast aluminum having a thickness of about 0.064 in. (0.163 cm).

SS is a 304 stainless steel alloy (Type SS-34) panel having a thickness of about 0.063 in. (0.160 cm), which is available from Q-Panel Lab Products (Cleveland, Ohio).

Cu is the copper side of a copper-clad FR-4 (glass-reinforced epoxy) laminate having a thickness of about 0.06 in. (0.152 cm), which is available from Laird Plastics (West Palm Beach, Fla.).

Cleaning of Substrates

Plastic substrates, except Nylon, were first cleaned in an ultrasonic bath containing a dilute soap solution to remove machine oils and other hydrocarbon residues, and then rinsed in clean water. Immediately before use, each plastic substrate was repeatedly cleaned by drawing a Kimwipe disposable wiper saturated with isopropyl alcohol over the test surface. In the final cleaning step, isopropyl alcohol was applied to the test surface using a TECHNICLOTH TX604 cleanroom wiper (The Texwipe Company, Upper Saddle River, N.J.). The test surface of each Nylon substrate was sprayed with isopropyl alcohol, wiped with a Kimwipe, sprayed with acetone, and wiped with a TECHNICLOTH TX604 cleanroom wiper. Metal substrates were cleaned in a similar manner using heptane followed by isopropyl alcohol. All substrates were allowed to air-dry for at least twenty minutes before application of a silicone composition.

Preparation of Specimens for Scrape Adhesion Testing

The freshly prepared silicone composition was drawn over the surface of a cleaned substrate with a doctor blade to achieve a film thickness of about 0.025 in. (0.0635 cm). The coated substrate was then heated in a forced air convection oven at a temperature of 70° C. for 30 minutes and then allowed to cool to room temperature. The substrate was scored with a razor blade to form two parallel lines separated by about 0.25 in. (0.635 cm), penetrating through the silicone layer and into the substrate.

Measurement of Scrape Adhesion

A stainless steel microspatula (Fisherbrand 21-401-5) having rounded ends was brought into contact with the cured silicone surface between the two parallel score lines, described above, at an angle of approximately 30° from the surface. A manual force was exerted on the spatula along the track between the score lines in an attempt to scrape the silicone product from the surface of the substrate. The failure mode is reported as adhesive, cohesive, or a combination thereof. Adhesive failure is further classified as weak, moderate, or strong as an indication of the relative force required to produce failure. Adhesive failure denotes clean debonding (release) of the silicone product from the substrate. Cohesive failure denotes fracture (splitting) of the silicone product itself and adherence of residue to the substrate.

Comparative Example 1

Part A of a silicone composition was prepared by combining 109.54 parts of Silicone Base, 0.032 part of Polymer A, and 0.43 part of Catalyst A in a 4-oz. polypropylene cup. The components were mixed for three consecutive 12-second cycles using a Hauschild AM-501 dental mixer. Part B was prepared by combining 101.40 parts of Silicone Base, 0.073 part of Polymer A, and 2.54 parts of Crosslinking Agent in a 4-oz. polypropylene cup and then mixing the components as described above for Part A. Equal parts by weight of Part A and Part B were combined in a polystyrene weighing dish and mixed for about 30 s using a Teflon-coated spatula. The scrape adhesion of the cured silicone product is shown in Table 1.

Example 1

Part A of Comparative Example 1 (2.20 parts), 0.094 part of ω-undecylenyl alcohol, and 0.093 part of titanium di-n-butoxide bis(2,4-pentanedionate) were combined in one region of a polystyrene weighing dish. Part B of Comparative Example 1 (2.20 parts) and 0.182 part of Crosslinking Agent were combined in an adjacent region of the weighing dish. The two portions were then mixed for about 30 s using a Teflon-coated spatula. The scrape adhesion of the cured silicone product is shown in Table 1.

Example 2

Part A of Comparative Example 1 (4.00 parts), 0.126 part of allyl alcohol propoxylate, and 0.169 part of titanium diisopropoxide bis(ethylacetoacetate) were combined in one region of a polystyrene weighing dish. Part B of Comparative Example 1 (4.00 parts) and 0.123 part of Crosslinking Agent were combined in an adjacent region of the weighing dish. The two portions were then mixed for about 30 s using a Teflon-coated spatula. The scrape adhesion of the cured silicone product is shown in Table 1.

Example 3

Part A of Comparative Example 1 (4.00 parts), 0.186 part of poly(ethylene glycol)monoallyl ether, and 0.169 part of titanium diisopropoxide bis(ethylacetoacetate) were combined in one region of a polystyrene weighing dish. Part B of Comparative Example 1 (4.00 parts) and 0.105 part of Crosslinking Agent were combined in an adjacent region of the weighing dish. The two portions were then mixed for about 30 s using a Teflon-coated spatula. The scrape adhesion of the cured silicone product is shown in Table 1.

Example 4

Part A of Comparative Example 1 (2.20 parts), 0.095 part of trimethylolpropane diallyl ether, and 0.080 part of titanium diisopropoxide bis(ethylacetoacetate) were combined in one region of a polystyrene weighing dish. Part B of Comparative Example 1 (2.20 parts) and 0.116 part of Crosslinking Agent were combined in an adjacent region of the weighing dish. The two portions were then mixed for about 30 s using a Teflon-coated spatula. The scrape adhesion of the cured silicone product is shown in Table 1.

Example 5

Part A of Comparative Example 1 (4.00 parts), 0.172 part of ω-undecylenyl alcohol, 0.116 part of tetra-iso-propyl titanate, and 0.083 part of 2,4-pentanedione were combined in one region of a polystyrene weighing dish. Part B of Comparative Example 1 (4.00 parts) and 0.130 part of Crosslinking Agent were combined in an adjacent region of the weighing dish. The two portions were then mixed for about 30 s using a Teflon-coated spatula. The scrape adhesion of the cured silicone product is shown in Table 1.

Example 6

Part A of Comparative Example 1 (4.00 parts), 0.171 part of ω-undecylenyl alcohol, 0.114 part of tetra-iso-propyl titanate, and 0.156 part of ethyl acetoacetate were combined in one region of a polystyrene weighing dish. Part B of Comparative Example 1 (4.00 parts) and 0.133 part of Crosslinking Agent were combined in an adjacent region of the weighing dish. The two portions were then mixed for about 30 s using a Teflon-coated spatula. The scrape adhesion of the cured silicone product is shown in Table 1.

Comparative Example 2

Part A of Comparative Example 1 (2.00 parts) and 0.082 part of titanium di-n-butoxide bis(2,4-pentanedionate) were combined in one region of a polystyrene weighing dish. Part B of Comparative Example 1 (2.00 parts) was placed in an adjacent region of the weighing dish. The two portions were then mixed for about 30 s using a Teflon-coated spatula. The scrape adhesion of the cured silicone product is shown in Table 1.

Comparative Example 3

Part A of Comparative Example 1 (5.00 parts) and 0.205 part of titanium diisopropoxide bis(ethylacetoacetate) were combined in one region of a polystyrene weighing dish. Part B of Comparative Example 1 (5.00 parts) was placed in an adjacent region of the weighing dish. The two portions were then mixed for about 30 s using a Teflon-coated spatula. The scrape adhesion of the cured silicone product is shown in Table 1.

Comparative Example 4

Part A of Comparative Example 1 (5.00 parts) and 0.417 part of titanium diisopropoxide bis(ethylacetoacetate) were combined in one region of a polystyrene weighing dish. Part B of Comparative Example 1 (5.00 parts) was placed in an adjacent region of the weighing dish. The two portions were then mixed for about 30 s using a Teflon-coated spatula. The scrape adhesion of the cured silicone product is shown in Table 1.

Comparative Example 5

Part A of Comparative Example 1 (5.00 parts) and 0.212 part of ω-undecylenyl alcohol were combined in one region of a polystyrene weighing dish. Part B of Comparative Example 1 (5.00 parts) and 0.166 part of Crosslinking Agent were combined in an adjacent region of the weighing dish. The two portions were then mixed for about 30 s using a Teflon-coated spatula. The scrape adhesion of the cured silicone product is shown in Table 1.

Comparative Example 6

Part A of Comparative Example 1 (4.00 parts), 0.170 part of 1-undecanol, and 0.169 part of titanium diisopropoxide bis(ethylacetoacetate) were combined in one region of a polystyrene weighing dish. Part B of Comparative Example 1 (4.00 parts) and 0.129 part of Crosslinking Agent were combined in an adjacent region of the weighing dish. The two portions were then mixed for about 30 s using a Teflon-coated spatula. The scrape adhesion of the cured silicone product is shown in Table 1.

TABLE 1

| | Scrape Adhesion | |
|---|---|---|
| Example | FR-4 | PPO |
| Comp. 1 | wAF | wAF |
| 1 | CF | CF |
| 2 | CF | CF |
| 3 | CF | CF |
| 4 | CF | CF |
| 5 | CF | mAF/CF |
| 6 | CF | CF |
| Comp. 2 | wAF | wAF |
| Comp. 3 | wAF | wAF |
| Comp. 4 | wAF | wAF |
| Comp. 5 | sAF | wAF |
| Comp. 6 | wAF | wAF | wAF denotes weak adhesive failure; mAF denotes moderate adhesive failure; sAF denotes strong adhesive failure; CF denotes cohesive failure; and mAF/CF denotes a combination of moderate adhesive and cohesive failure modes.

Comparative Example 7

Part A of a silicone composition was prepared by combining 62.22 parts of Resin/Polymer Blend, 37.33 arts of Silica, 0.13 part of Catalyst B, and 0.32 part of Catalyst A. Part B was prepared by combining 64.18 parts of Resin/Polymer Blend, 29.89 parts of Crosslinking Agent, 5.03 parts of Pigment, and 0.90 part of Inhibitor. Part A (13.00 parts) and 1.30 parts of Part B were combined in a 2-oz. polypropylene cup. The components were mixed for 12 seconds using a Hauschild AM-501 dental mixer, about 30 seconds using a Teflon-coated spatula, and 12 seconds using the dental mixer. red silicone product is shown in Table 2.

Example 7

To 1.50 parts of Part A of Comparative Example 7 was added sequentially 0.349 part of ω-undecylenyl alcohol and 0.30 part of titanium diisopropoxide bis(ethylacetoacetate) in a 1-oz. polypropylene cup. The mixture was blended for 12 seconds using a Hauschild AM-501 dental mixer and for about 30 s using a Teflon-coated spatula. Part B of Comparative Example 7 (1.50 parts) and 0.268 part of Crosslinking Agent were added to the mixture. The components were then mixed for two consecutive 12-second cycles using the dental mixer. The scrape adhesion of the cured silicone product is shown in Table 2.

TABLE 2

| | Scrape Adhesion | | | | | | | | | |
|---|---|---|---|---|---|---|---|---|---|---|
| Example | FR-4 | PC | PBT | N66 | ABS | PPO | PPS | Al | SS | Cu |
| Comp. 7 | wAF | wAF | wAF | wAF | wAF | wAF | wAF | mAF | wAF | wAF |
| 7 | CF | CF | CF | CF | CF | CF | CF | CF | CF | CF | wAF denotes weak adhesive failure; mAF denotes moderate adhesive failure; and CF denotes cohesive failure.

That which is claimed is:
1. A silicone composition prepared by mixing:
(A) 100 parts by weight of an organopolysiloxane containing an average of at least two silicon-bonded alkenyl groups per molecule;
(B) an organohydrogenpolysiloxane containing an average of at least two silicon-bonded hydrogen atoms per molecule in a concentration sufficient to cure the composition;
(C) 0.5 to 50 parts by weight of a hydroxy-functional organic compound having a molecular weight up to about 1000 and containing at least one hydroxy group and at least one aliphatic carbon-carbon multiple bond per molecule;
(D) 1 to 10 parts by weight of a titanium chelate having a formula selected from:

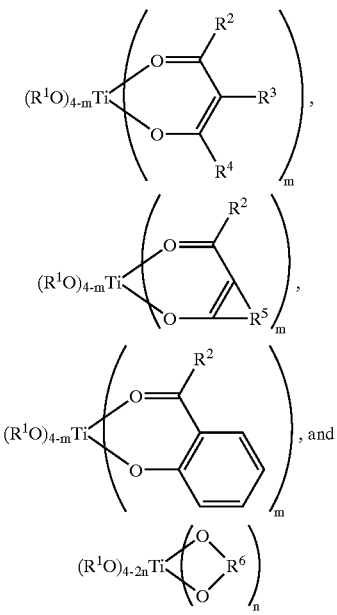

wherein each $R^1$ is independently alkyl or $-R^7O)_qR^8$, wherein $R^7$ is hydrocarbylene, $R^8$ is hydrocarbyl, and q is from 1 to 20; each $R^2$ is independently hydrocarbyl, halohydrocarbyl, cyanoalkyl, alkoxy, cyanoalkoxy, amino, or hydrocarbyl-substituted amino; each $R^3$ is independently hydrogen, hydrocarbyl, halohydrocarbyl, or acyl; each $R^4$ is independently hydrocarbyl, halohydrocarbyl, or cyanoalkyl; $R^5$ is alkanediyl, wherein the free valencies are separated by 3, 4, or 5 carbon atoms; $R^6$ is hydrocarbylene, wherein the free valencies are separated by 2, 3, or 4 carbon atoms; m is an integer from 1 to 3; and n is 1 or 2; wherein $R^1$, $R^2$, $R^3$, $R^4$, $R^5$, and $R^6$ are free of aliphatic carbon-carbon multiple bonds; and (E) a catalytic amount of a hydrosilylation catalyst.

2. The silicone composition according to claim 1, wherein the organopolysiloxane is a polydiorganosiloxane.

3. The silicone composition according to claim 1, wherein the concentration of component (B) is sufficient to provide from 0.5 to 5 silicon-bonded hydrogen atoms per alkenyl group in components (A) and (C) combined.

4. The silicone composition according to claim 1, wherein the carbon-carbon multiple bond in the hydroxy-functional organic compound is located at a terminal position.

5. The silicone composition according to claim 4, wherein the carbon-carbon multiple bond is part of a terminal group having the formula —CH=CH$_2$.

6. The silicone composition according to claim 5, wherein the hydroxy-functional organic compound is undecylenyl alcohol, a poly(ethylene glycol)monoallyl ether, a poly(propylene glycol)monoally ether, or a poly(ethylene glycol)-co-poly(propylene glycol)monoallyl ether.

7. The silicone composition according to claim 1, wherein the concentration of the component (C) is from 0.5 to 10 parts by weight, per 100 parts by weight of component (A).

8. The silicone composition according to claim 1, wherein the titanium chelate has the formula:

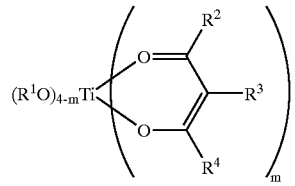

wherein $R^1$, $R^2$, $R^3$, $R^4$, and m are as defined above.

9. The silicone composition according to claim 8, wherein $R^2$ is —OCH$_2$CH$_3$, $R^3$ is —H, and $R^4$ is CH$_3$.

10. The silicone composition according to claim 1, wherein the titanium chelate has the formula:

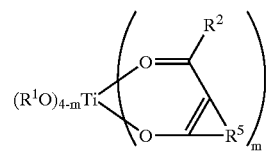

wherein $R^1$, $R^2$, $R^5$, and m are as defined above.

11. The silicone composition claim 1, wherein the titanium chelate has the formula:

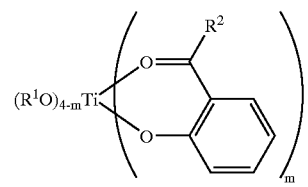

wherein $R^1$, $R^2$, and m are as defined above.

12. The silicone composition according to claim 1, wherein the titanium chelate has the formula:

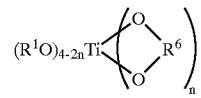

wherein $R^1$, $R^6$, and n are as defined above.

13. The silicone composition according to claim 1, wherein the concentration of component (D) is from 1 to 5 parts by weight, per 100 parts by weight of component (A).

14. A cured silicone product comprising a reaction product of the composition of claim 1.

15. A cured silicone product comprising a reaction product of the composition of claim 4.

16. A cured silicone product comprising a reaction product of the composition of claim 8.

17. A cured silicone product comprising a reaction product of the composition of claim 10.

18. A cured silicone product comprising a reaction product of the composition of claim 11.

19. A cured silicone product comprising a reaction product of the composition of claim 12.

20. A multi-part silicone composition, comprising:

(A) 100 parts by weight of an organopolysiloxane containing an average of at least two silicon-bonded alkenyl groups per molecule;

(B) an organohydrogenpolysiloxane containing an average of at least two silicon-bonded hydrogen atoms per molecule in a concentration sufficient to cure the composition;

(C) 0.5 to 50 parts by weight of a hydroxy-functional organic compound having a molecular weight up to about 1000 and containing at least one hydroxy group and at least one aliphatic carbon-carbon multiple bond per molecule;

(D) 1 to 10 parts by weight of a titanium chelate having a formula selected from:

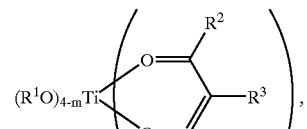

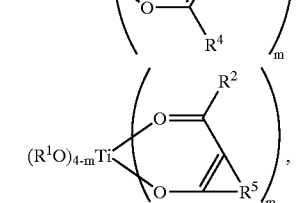

-continued

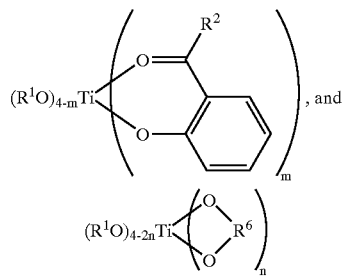
, and wherein each $R^1$ is independently alkyl or $-R^7O)_qR^8$, wherein $R^7$ is hydrocarbylene, $R^8$ is hydrocarbyl, and q is from 1 to 20; each $R^2$ is independently hydrocarbyl, halohydrocarbyl, cyanoalkyl, alkoxy, cyanoalkoxy, amino, or hydrocarbyl-substituted amino; each $R^3$ is independently hydrogen, hydrocarbyl, halohydrocarbyl, or acyl; each $R^4$ is independently hydrocarbyl, halohydrocarbyl, or cyanoalkyl; $R^5$ is alkanediyl, wherein the free valencies are separated by 3, 4, or 5 carbon atoms; $R^6$ is hydrocarbylene, wherein the free valencies are separated by 2, 3, or 4 carbon atoms; m is an integer from 1 to 3; and n is 1 to 2; wherein $R^1$, $R^2$, $R^3$, $R^4$, $R^5$, and $R^6$ are free of aliphatic carbon-carbon multiple bonds; and (E) a catalytic amount of a hydrosilylation catalyst; provided components (A), (B), and (E) are not present in the same part.

* * * * *